United States Patent [19]

Manzoni

[11] 3,919,494

[45] Nov. 11, 1975

[54] PULSE CONTACT DELAYING MECHANISM FOR TELEPHONE DIALS

[75] Inventor: Angelo Manzoni, Milan, Italy

[73] Assignee: International Standard Electric Corporation, New York, N.Y.

[22] Filed: Dec. 27, 1973

[21] Appl. No.: 429,009

[30] Foreign Application Priority Data

| | | |
|---|---|---|
| Jan. 1, 1973 | Italy | 19141/73 |
| Feb. 15, 1973 | Italy | 20419/73 |
| Mar. 23, 1973 | Italy | 22026/73 |

[52] U.S. Cl. .............. 179/90 R

[51] Int. Cl.[2] .............. H04M 1/34

[58] Field of Search .............. 179/90 R, 90 A, 90 FW

[56] References Cited

UNITED STATES PATENTS

| | | | |
|---|---|---|---|
| 2,887,539 | 4/1959 | Alexandersson et al. | 179/90 R |
| 2,963,554 | 12/1960 | Hershey | 179/90 R |
| 3,336,446 | 8/1967 | Ruehnle | 179/90 R |
| 3,557,326 | 1/1971 | Tessarello et al. | 179/90 R |

FOREIGN PATENTS OR APPLICATIONS

| | | | |
|---|---|---|---|
| 2,005,073 | 3/1969 | France | 179/90 R |
| 2,952,867 | 4/1970 | Australia | 179/90 R |

*Primary Examiner*—Kathleen H. Claffy
*Assistant Examiner*—Gerald L. Brigance
*Attorney, Agent, or Firm*—James B. Raden; Marvin M. Chaban

[57] ABSTRACT

An apparatus for delaying the time between dial pulses in a telephone dial pulsing mechanism has a rotating cam-yoke assembly cooperating between a number of fixed rotation impeding members. The rotating yoke contacts a first impeding member and is delayed by a predetermined time increment until the cam moves the hoke away from the first impeding member. The yoke rotates into contact with a second member and is further delayed a second predetermined time increment before being released by the cam. A total predetermined time delay can be obtained between pulses by this method depending on the number and location of the impeding members.

8 Claims, 16 Drawing Figures

PULSE CONTACT DELAYING MECHANISM FOR TELEPHONE DIALS

BACKGROUND OF THE INVENTION

In telephone dialing systems of the type having a circular finger wheel for charging a spring-driven gear train assembly which in turn makes and breaks electrical contacts thereby translating the rotational dialing motion into predetermined electrical pulses, there is generally required a time delay between the rotation of the finger wheel and the pulsing of the electrical contacts. This time delay before the start of the output of pulses is helpful to prevent misdialing by the user, and in some telephone switching circuits is necessary in order to provide sufficient time for the telephone switching mechanism.

One method employed for increasing the operative time delay between the dialing and pulsing mechanism is simply to increase the distance between the number one unit and the finger stop on the telephone dial. This is a relatively simple solution but provides only a limited increase in the time delay increment. Another method commonly employed is to insert a rotating cam-yoke assembly between the gear train and the electrical contacts. This allows a complete rotation of the cam before the yoke is employed to break the electrical contact. The art concerning telephone dialing mechanisms using the rotating cam-yoke method to delay the time between the rotation of the dial and the electrical impulses defines this time as "lost motion time," so that for the purpose of this application the lost motion time is defined to be the time increment that lapses between the digital pulse and the resulting electrical pulse.

A pulsing mechanism using the rotating cam-yoke method is described in U.S. Pat. No. 2,963,554 in which a particular design of the cam and yoke assembly provides lost motion time but is limited to about one digital pulse before emitting an electrical pulse. An improved lost motion time dialing mechanism is described in U.S. Pat. No. 3,557,326 where the rotating yoke-cam assembly is designed to provide lost motion time equivalent to two rotations of the cam before creating an electrical impulse. Some telephone switching systems, however, require longer lost motion times than are currently available. Lost motion time increments can be required to consist of as much as a few hundred milliseconds time delay.

SUMMARY OF THE INVENTION

This invention provides telephone dialing mechanisms having longer time delay increments prior to outpulsing that have heretofore been available. The dialing mechanism of this invention consists of a spring-loaded gear train assembly together with a rotating cam-yoke mechanism between the gear train assembly and the electrical pulse making contacts. However, the rotating cam-yoke assembly further includes a number of predeterminately placed fixed abutments or pins so that an extension of the rotating yoke contacts these fixed abutments for a predetermined time increment and is released upon further rotation of the cam within the rotating cam-yoke assembly. By using a number of these predetermined positioned stops a large lost motion time increment can therefore be provided.

The fixed abutments provide lost motion time increments but the actual switching is accomplished by the contact made between the rotation yoke and the fixed electrical contact assembly. It has been found, however, that upon repeated operation in using the yoke for contacting and opening the electrical contacts that the yoke can become forced between the two contact holding springs and is then no longer able to complete its rotation. This could happen, for example, if the receiver is dropped or otherwise mishandled during dialing. One embodiment of this invention further provides a horizontal guide stop at the point where the rotating yoke meets the electrical contact assembly so that the yoke can be stopped by the guide without becoming jammed between the arms of the contact holding springs.

Most rotating cam-yoke devices used in telephone dialing apparatus provide an extended arm to the electrical contact holding springs so that this extended arm acts like a cam follower in combination with the rotating cam. The purpose of the extended arm is to keep the electrical contacts of the pulse generating device in a closed state until the rotating yoke contacts the electrical contact spring to open the contacts. A further embodiment of this invention provides a contact holding spring mechanism that does not require an extended arm and cam follower device as is currently used. This fixed contact holding spring element consists of a simply constructed rigid backstop member that extends from the rear surface of the telephone dial number plate. The rotating yoke therefore continues to contact the electrical contact holding spring in order to open the contacts during the impulsing phase of the rotating cam-yoke cycle without the structure provided by the extended cam follower arm of the prior art.

BRIEF DESCRIPTION OF THE DRAWINGS

The invention will be better understood with reference to the following description and the accompanying drawings, in which.

DESCRIPTION OF THE PREFERRED EMBODIMENT

Figure 1:
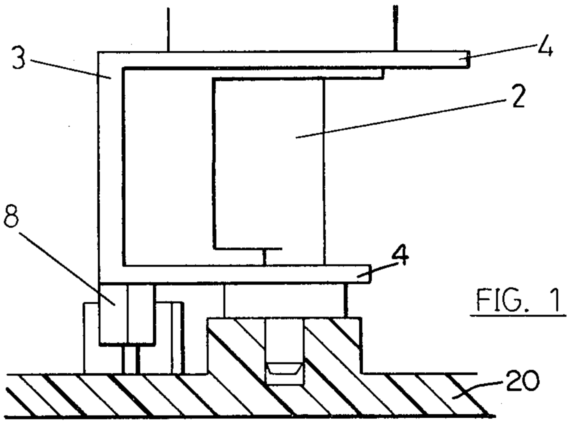
FIG. 1 shows a front view of a yoke being pivoted on an eccentric cam, according to the first embodiment of this invention.
Figure 2:
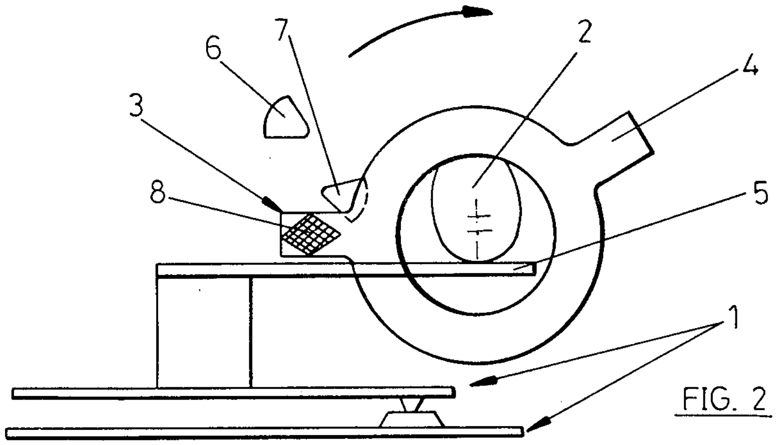
FIG. 2 shows the starting position of the yoke as in FIG. 1 the dial being charged.

With reference to the above FIGS. 1 and 2, there is shown the yoke with its contact operating or crosspiece portions 3 and arms 4, said yoke being clockwise rotated by friction engagement with the cam surface of the eccentric 2. Furthermore, contact-holding springs 1 and an extension 5 of one of the contact springs are shown, extension 5 being arranged in parallel with the spring 1 and resulting with its free end resting on the cam surface of the eccentric 2. Also visible are stationary abutments pins 6, 7 which project from the rear face of the dial number plate 20 and are integral therewith. The pins 6 and 7 are almost triangular in cross section and provided with a slightly rounded off working edge. The working edge of each of the said pins are so positioned that one of the pins is inwardly directed towards the axis of the cam of the eccentric 2, and the other is directed outwards relative to the first one. The two limit pins 6 and 7 are positioned along to two concentric circumferences which are angularly spaced from one another.

Furthermore, the end of portion 3 (FIG. 1) is so shaped as to support a movable extension 8 integral therewith. The axis of the movable extension 8 is parallel to the axis of the fixed limit pins 6 and 7. The arms 4 of the yoke are connected to one another at their outer end by a crosspiece 3, one side portion of which extends besides the yoke arm in the movable extension 8. The movable pin 8 is rhombic in cross section and is formed with two working edges, one of which extends inwardly while the other extends outwardly relative to the center of the yoke.

Figure 3:
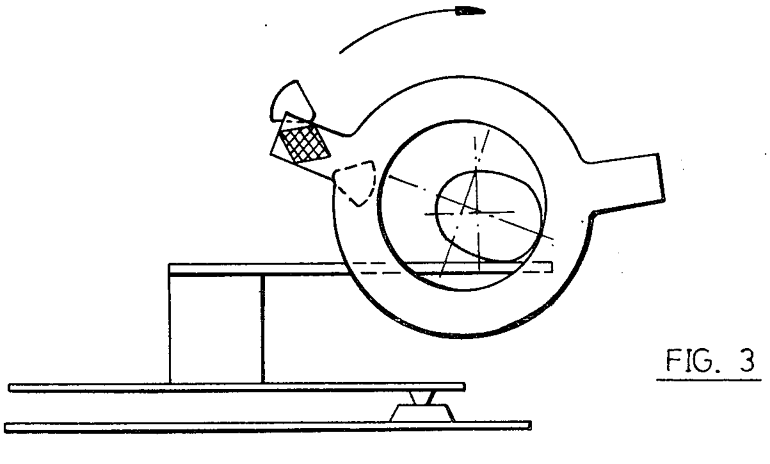
FIG. 3 shows the position reached by the yoke immediately after its disengagement from the first pin.

The operation of the device embodiment of FIGS. 1–3 is as follows. Once the dial has completely charged its spring by being rotated (position of FIG. 2) and is released free to rotate back, the inwardly oriented edge of the movable extension 8 contacts the slanting plane of one face of the correspondent edge of the fixed pin 7. While the rotation of cam 2 is continued the yoke makes a horizontal translation movement yoke and the movable extension 8 carried by the yoke is caused to move due to the relative position of the rotation centers of the yoke and of the cam. The edge of the movable extension 8 moves outwardly away from the corresponding working edge of pin 7. The working edges are therefore disengaged one from the other and the yoke is allowed to freely rotate again. During rotation of yoke, the outer working edge of movable extension 8 meets the corresponding working edge of pin 6 (FIG. 3) and abuts against it, thereby preventing the yoke from rotating when the yoke and the cam are out of phase. While the cam 2 continues to rotate with a translational motion the disengagement of the pin 6 occurs. The yoke thus starts to rotate again until its crosspiece 3 of the yoke rests on the longer one of the two contact springs 1, while it stops against end of the shorter spring.

The engagement and the temporary stopping of the yoke in the position of the first pin 6 allow an intermediate rotation of the cam for a pause time period corresponding to two idle pulses of the minimum required duration of 200 milliseconds, starting from the beginning of the rotation of the rotating dial.

In order to meet further specifications which require a minimum pause length of 240 milliseconds, a second obstacle has been provided, i.e., the second pin 7 which temporarily stops the yoke in such a position before the same can be further rotated.

Figure 4:
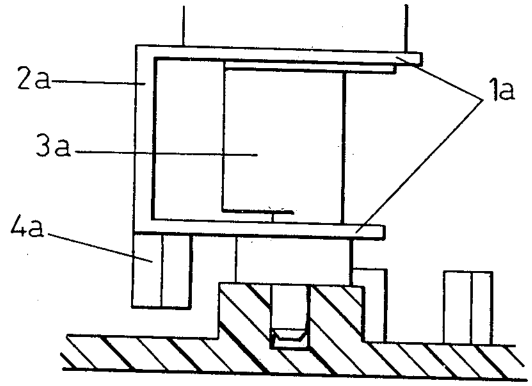
FIG. 4 shows a cross section view of the moving yoke for generating or providing dial pulses according to the second embodiment of this invention.
Figures 5, 6:
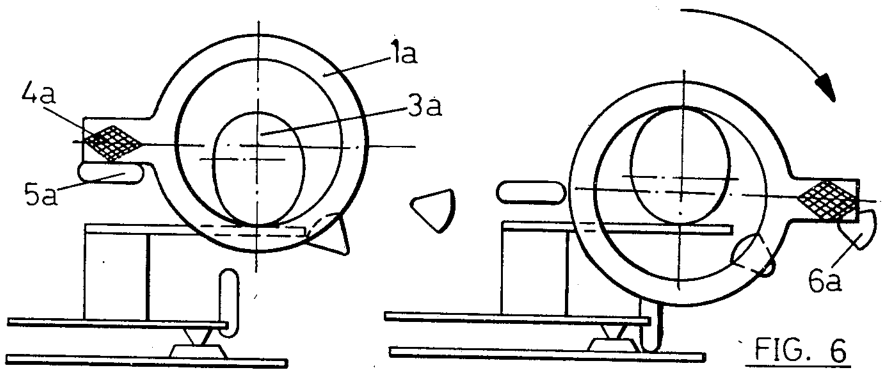
FIG. 5 is a top view of the yoke in FIG. 4 in the initial position.
FIGS. 6, 7, 8, 9 and 10 show different stages of the yoke rotation for a pulse delay up to 200 milliseconds.

FIG. 4 in general, and more particularly FIG. 5, show the second embodiment of this invention. The yoke 1*a* includes two superimposed coaxial rings which are spaced from one another and connected to one another by the cross member 2*a* at the outer side thereof. Inside the rings of the yoke 1*a*, a cam 3*a* is caused to rotate by a loaded spring actuated by the perforated finger wheel disc of the rotatable telephone dial, thus also causing the yoke 1*a* to rotate due to friction. The cross member 2*a* extends on the one side and has an extension arm extending parallel to it. This extension is in the shape of a column 4*a* rhombic in cross section with two operative rounded corners one facing the center of rotation of the yoke and the other in the opposite direction facing outwardly.

When the finger wheel disc is fully rotated, winding up the conventional return spring (not shown), the yoke 1*a* starts to rotate from the position where the moving extension member 4*a* rests on the long side of a substantially rectangular projection or pin 5*a* rigid with the numbered support plate. While rotating in a clockwise direction for a length, extension 4*a* abuts against a fixed pin 6*a* (FIG. 6), which is triangular in cross section with an operative rounded corner spacing the center of rotation of the yoke. One face of the rhombic configuration of the member 4*a* slidably rests on the corresponding face of the fixed pin 6*a* which is triangular in cross section and is in parallel relationship therewith. Due to the continuous rotation of the cam 3*a*, the yoke undergoes a translation movement and thus the member 4*a* slowly moves towards the left until its face resting on the fixed pin 6*a* is disengaged therefrom when the rounded corners of the same are no more in contact with one another.

This allows the yoke to rotate once again. Such a rotational motion is determined again after a certain space length due to the action of a second fixed pin 7*a* (FIG. 7) similar to the fixed pin 6*a* except that it has a rounded working or operative corner facing outwardly this time. Furthermore, the distance of the pin 7*a* from the center of rotation of the yoke is less than that of pin 6*a*. Also in this case the corresponding face of the moving extension member slowly slides on the corresponding face of the fixed pin and disengages therefrom when the two corresponding working corners move away from one another.

Figures 7, 8:
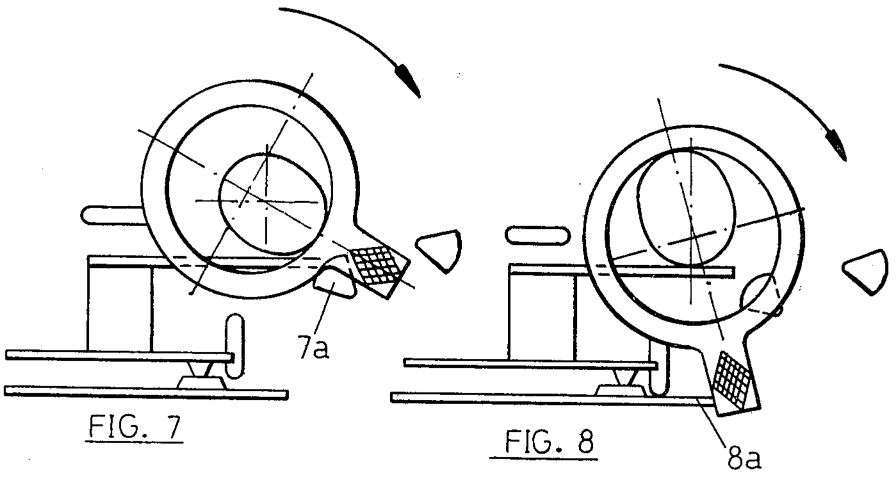

The yoke 1*a* starts to rotate again and the cross member 2*a* thereof comes now to rest on the end of the longer spring of the pair of contact-bearing springs 8*a* (FIG. 8). Owing to the continuous rotation of the cam 3*a* the pair of contact-bearing springs are moved away from the center of rotation of yoke 1*a* because a portion depending upon the pair of contact-bearing springs 8*a* is moved away from the rotating cam surface and transmits its periodical moving away motion to the pair of springs 8*a* from the center of rotation (FIG. 8).

As a consequence of the said periodic moving away motion of the contact-bearing springs, the extension member comes to rest on the larger side of a substantially rectangular pin 9*a* (FIG. 9) projecting from the rear face of the number support plate of the dial. As the yoke reaches this end rotational position, by acting on the contact-bearing springs, the cam causes a series of outpulses corresponding to the number dialed through the telephone dial.

It should be noted that although the position of the two pins 6*a* and 7*a* are illustrated in the drawing as arranged at about 180° relative to the start position of the rotating yoke, as shown in FIG. 5, i.e., the position in which the moving extension member 4a rests on the substantially rectangular projection 5a; and since this is a preferable position the same could be arranged in any other position along the circumference run by the rotating yoke. Of course the mutual angular relationship as described above must be provided.

The above described embodiment finds application in the telephone dials with a delay in the pulse starting, i.e. two idle pulses of 200 milliseconds.

Figures 9, 10, 11, 12, 13:
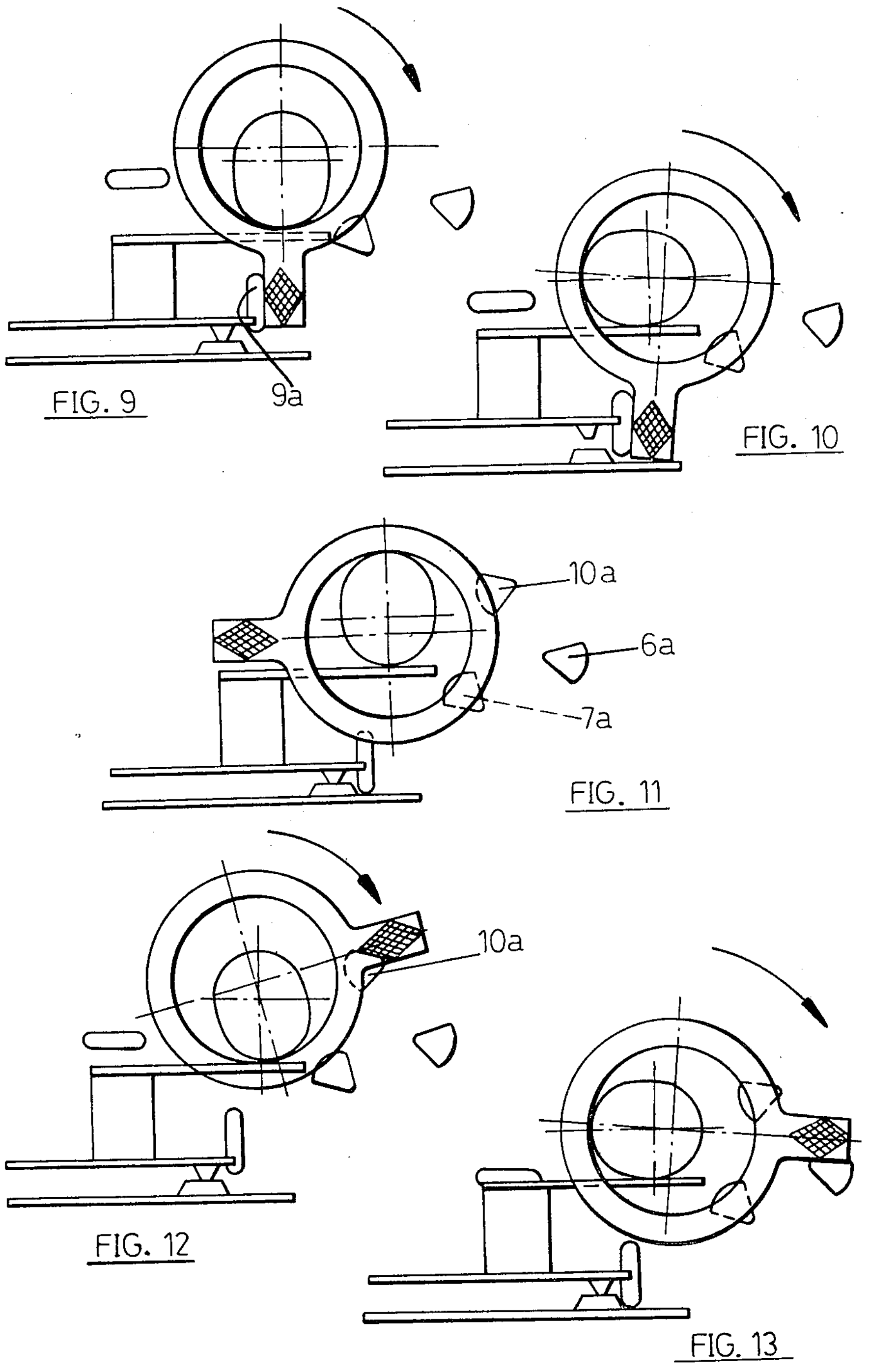
FIGS. 11, 12 and 13 show different stages from the initial stage of rotational positions of the yoke for a pulse delay of 240 milliseconds.

One embodiment suitable for telephone dials with a pulse delay, i.e., two idle pulses or 240 milliseconds is illustrated in FIGS. 11, 12 and 13.

Instead of two fixed pins, three fixed pins are provided as generally indicated at 10a, 6a and 7a, respectively (FIG. 11). All other details are as those already described above and are indicated by the same reference numbers. Only that part of the operation which differs from that described above will be described.

After the yoke due to the action of the cam which continuously rotates owing to the action of the spring loaded by the perforated finger wheel disc, has started its clockwise rotation, the moving member 4a thereof which move along a circular path meets with a fixed pin 10a (FIG. 12) located on the same circumference as that of the fixed pin 7a. This fixed pin 10a has an angular distance equal to that existing between the fixed pins 6a and 7a.

The rounded working corner of the fixed pin 10a faces outwardly as that of the pin 7a. Once the face of the extension member 4a has stopped on the corresponding parallel face of the fixed pin 10a, the same slides on the latter due to the translational motion given by the cam to the driven yoke until the working corner of extension 4a disengages from the rounded working corner of pin 6a (FIG. 13). The yoke starts again to rotate in a clockwise direction, thereby providing the stop and rotation stages as previously described in connection with the embodiment having a delay in pulse starting of 200 milliseconds.

The function of the substantially rectangular projection 9a (FIG. 9) will be now described. At the end of the yoke rotation, the periodic sliding motion of the rhombic section positions the moving extension member 4a against the longer side of the substantially rectangular projection 9a. The sliding motion of the extension corner is smooth and uniform, i.e., with no irregularities being met thus allowing the contact-bearing springs to be free from vibrations. An improvement is thus attained relative to the first embodiment. In the known art, the crosspiece portion which in FIGS. 1 and 2 is indicated at 3 during its alternating sliding movement rests directly against the tip of the contact-bearing springs which results in irregularities owing to the shearing action of the spring tip. Vibrations transmitted to the springs causes spurious pulses to be emitted. In the prior art approaches, false pulses may further occur should the telephone set fall on the floor. The crosspiece portion 3 of the yokes would have a tendency to catch under the end of the shorter spring and lock there, thereby holding the contacts in a permanent closed condition, such inconvenience being completely eliminated through this embodiment of the present invention.

Figure 14:
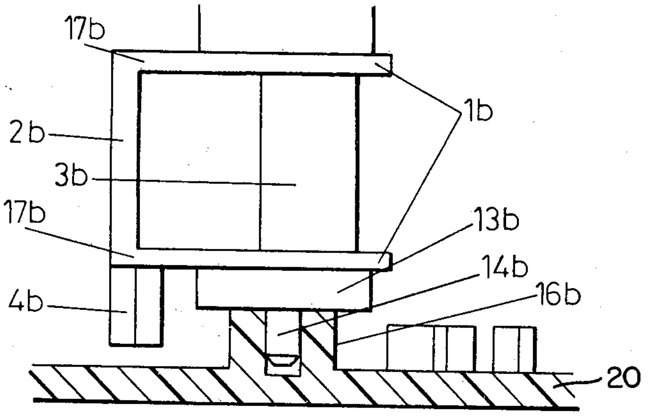
FIG. 14 illustrates in a front cross section view a yoke provided with a support for the pulse emitter delay device according to the third embodiment of this invention.
Figure 15:
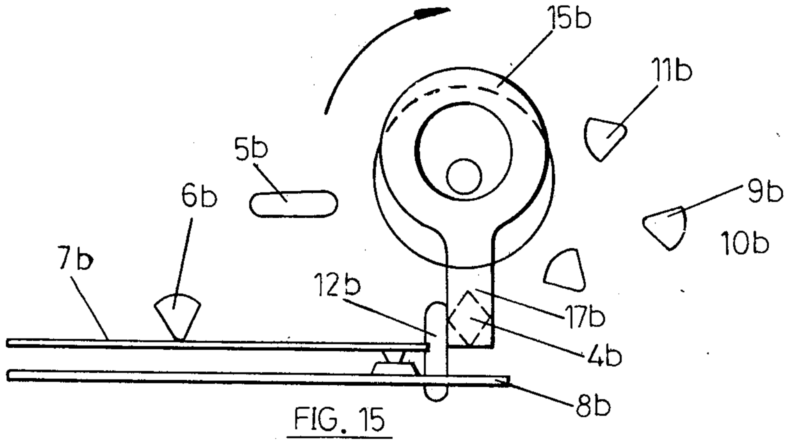
FIGS. 15 and 16 show top views of the yoke assembly in FIG. 14 in two operational positions thereof.
Figure 16:
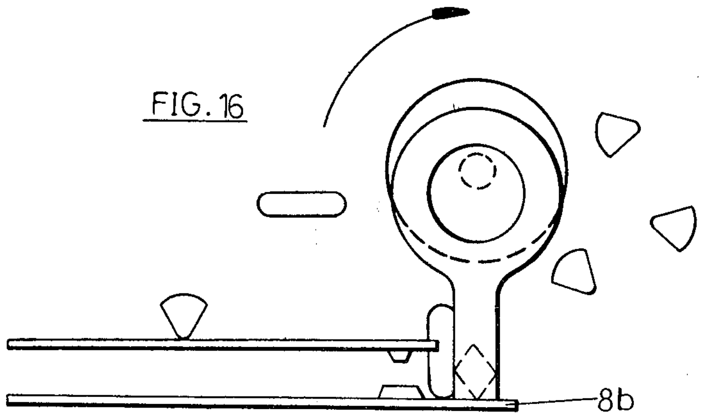

With reference to the embodiment of FIGS. 14, 15 and 16, particularly to FIGS. 15 and 16 the two yoke arms 17b are parallel to one another terminate with two parallel rings 15b. The holes of both rings 15b are centered on a common axis surround a cylindrical member 3b at both ends thereof, so that a slight friction occurs between the cylindrical member 3b and rings 15b of the yoke 1b, such friction being also determined by one of the yoke rings resting on a disc 13b pivoted through a pin 14b, which rotates in a blind hole formed in an embossed portion 16b on the rear side of the dial number plate indicated by the reference numeral 20.

The cylindrical member 3b is integrally supported by the disc 13b and the axis of the latter is not coincident with that of the cylindrical member 3b but is spaced therefrom to some extent. Such misalignment between the disc 13b and the cylinder integrally secured thereto, when the disc is rotating usually in clockwise direction due to the action of the dial spring being unwound, causes the cylindrical member 3b to move along a circular path around the axis of the disc 13b. Due to friction the yoke 1b is caused to rotate by the rotating cylindrical member 3b and to move therewith during its translational motion. The arms 17b of the yoke 1b which form two extensions from corresponding portions of the rings 15b and are also parallel to one another, are connected at the outer end thereof to a cross member 2b to be parallel to the axis of rotation of the disc 13b. The cross member 2b extends past its connection point to a yoke arm 17 b, i.e., the yoke arm adjacent to rear face of the number plate 20 of the telephone dial, thereby defining a moving extension or member 4b.

Of course moving member 4b could be configured to extend past its connection point to the other parallel arm or in many other directions from the upper or lower ring.

This moving member 4b is rhombic-like in cross section with a diagonal of the rhombus parallel to one arm of the yoke, the said rhombic column being integral with said one yoke arm and being moved therewith.

Upon rotation, the yoke moves away from the substantially rectangular projection 5b against which it rests in an inoperative condition, and engages then with obstacles or stop members (11b and 9b for a delay of 200 milliseconds and 9b and 10b for a delay of 240 milliseconds in the manner previously described) arranged along the path thereof to provide a predetermined delay time period for applying dialing pulses, as already disclosed in Italian Pat. No. 814,839 and in the Patent of Addition thereto No. 838,076.

At the end of the determined path provided with the relative delaying members, the moving member 4b abuts against the substantially rectangular projection 12b (FIG. 16). The support members 13b and the cylinder 3b integral therewith continues to rotate thus causing the moving member 4b to perform the reciprocating spring impulsing movements while an edge thereof slides along the longer face of the projection 12b. These reciprocating movements are transmitted from the cross member 2b to longer contact-bearing spring 8b by causing the cross-member to rest against the latter. This spring 8b is intermittently moved away from the other shorter spring 7b. The contact at the ends of the two springs are thus opened and closed periodically, thereby providing dialing pulses. The shorter spring 7b is secured by means of a fixing element or backstop 6b which prevents the same from moving backward upon the contact closing movement.

It should be understood that the above description of specific examples of the present invention is not to be considered as a limitation to the scope of the invention.

What is claimed is:

1. A telephone dial pulsing mechanism of the type having a rotatable finger wheel and spring, a gear train assembly rotated in a first direction responsive to rotation of said finger wheel and in a return direction by said spring, a pair of flexible contact springs coupled for providing impulses during gear rotation in the return direction, and cam and yoke means rotated by said gear train assembly for producing a time delay between the rotation of said gear train assembly and the operation of said impulse providing springs, wherein the improvement comprises means for providing an added time delay by slowing return rotation of said cam and yoke means and an extension of the yoke, and a first fixed member located at a rest position before the start of the return rotation of said cam and yoke means, said first fixed member located adjacent the circumference of the orbital part of said cam and yoke means for providing a stop for said yoke extension at its initial rest position, and a second fixed member proximate said contact springs and providing a guiding surface for said yoke wherein said yoke has a main arm for contacting and breaking the spring contact and a cantilevered extension rotative through a path in the plane of said fixed members whereby said yoke extension slides along said second fixed member and said main arm contacts said springs during the contact opening phase of the cam-yoke rotational cycle.

2. A telephone dial pulsing mechanism according to claim 1 wherein said first fixed member is substantially rectangular in cross section and is fixedly attached to the rear surface of a telephone dial number plate bearing the cam and yoke means; and wherein said second fixed member is substantially rectangular in cross section and is fixedly attached to the rear surface of the telephone dial number plate.

3. A telephone dial pulsing mechanism of the type having a rotatable finger wheel and spring, a gear train assembly, a pair of flexible contact springs for producing impulses during rotation of said gear assembly, cam and yoke means rotated by said assembly for producing a time delay between the start of gear assembly rotation and the initiation of impulses produced by said contact springs wherein the improvement comprises fixed stop means positioned to cooperate with said cam and yoke means for providing lost motion time, and a fixed backstop member abutting one leg of said contact springs thereby holding said contact spring under tension so that the contacts remain in a normally closed position.

4. The telephone dial pulsing mechanism of claim 3 wherein said backstop member comprises a pin which has a triangular cross section and is fixedly attached to the interior of a telephone dial number plate bearing said gear train assembly.

5. The telephone dial pulsing mechanism of claim 3 including a third fixed stop member located on a circumference concentric with the center of rotation of said cam and yoke means, and predeterminately positioned relative to said first mentioned and second mentioned members to produce a time delay of 240 milliseconds.

6. A telephone dial pulsing mechanism of the type having a rotatable finger wheel and spring mounted for rotation relative to a telephone dial plate, a gear train assembly rotated by said finger wheel, a pair of flexible contact springs for producing impulses during rotation of said gear train assembly, cam and yoke means for producing a time delay between the start of gear rotation and the production of impulses by said contact springs wherein the improvement comprises:

a. a yoke of said cam and yoke means having a single extension arm thereon directed toward said dial plate and rotative with said yoke;

b. a first stop element of rectangular cross section fixedly attached to the rear of the telephone dial number plate at a point along the rotational circumference of said cam-yoke means and positioned to engage said extension arm providing a stop for said yoke at one rest position;

c. a second stop element of triangular cross section fixedly attached to the rear of the telephone dial plate and located at a point on the rotational circumference of said yoke extension arm, the apex of said stop element pointing toward the center of rotation of said cam-yoke means, said second stop element providing a temporary motion obstruction for said rotating yoke;

d. a third stop element of triangular cross section fixedly attached to the rear of the telephone dial number plate and located further along the rotational circumference of said yoke extension arm at a point between said second stop means and the center of rotation for said cam-yoke means, the apex of said triangle pointing away from the center of rotation of said cam-yoke means, said third stop means providing a further motion obstruction by engaging said yoke extension arm; and e. fourth stop means of rectangular cross section fixedly attached to the rear surface of the telephone dial number plate and located proximate to said contact springs for providing a guiding surface for said yoke extension arm whereby said yoke slidingly engages said fourth stop element on continued rotation of said yoke to contact said one of said contact springs and open the contacts thereon.

7. A telephone dial pulsing mechanism of claim 6 further including a contact spring backstop member stationarily attached to the rear surface of the telephone dial plate abutting the other of said contact springs thereby holding said contact springs in a normally closed position.

8. A telephone dial pulsing mechanism comprising a rotatable gear train, a driven member in said gear train, a pair of contact spring members operative to produce impulses during the rotation of said gear train, said driven member including a yoke rotative responsive to rotation of said gear train, said yoke initiating the production of impulses by contacting one of said spring members during a period of said gear train rotation, the invention comprising means for delaying the initiation of production of impulses, including an extension of said yoke rotative with said yoke to describe an orbital path, a plurality of stationary means interposed in said orbital path to engage said extension during rotation of said yoke to temporarily impede rotation of said yoke in the one direction and delay the occurrence of the contacting of said one spring member by said yoke, a stop member positioned to be engaged by said extension at the start of production of impulses, and a surface of said stop member providing a radial reciprocating path for said extension to cause said yoke to describe a like path opening and closing a circuit between said contact springs.

* * * * *